(12) United States Patent
Hui et al.

(10) Patent No.: US 8,639,116 B2
(45) Date of Patent: Jan. 28, 2014

(54) DIGITAL SUBCARRIER OPTICAL NETWORK UTILIZING DIGITAL SUBCARRIER CROSS-CONNECTS WITH INCREASED ENERGY EFFICIENCY

(76) Inventors: Ron Hui, Lenexa, KS (US); Andrea Fumagalli, Dallas, TX (US)

( * ) Notice: Subject to any disclaimer, the term of this patent is extended or adjusted under 35 U.S.C. 154(b) by 127 days.

(21) Appl. No.: 13/330,647

(22) Filed: Dec. 19, 2011

(65) Prior Publication Data

US 2012/0269510 A1    Oct. 25, 2012

Related U.S. Application Data

(60) Provisional application No. 61/424,581, filed on Dec. 17, 2010.

(51) Int. Cl.
*H04J 14/00* (2006.01)
*H04Q 11/00* (2006.01)

(52) U.S. Cl.
CPC .................. *H04Q 11/0005* (2013.01)
USPC ................... 398/50; 398/56; 398/57

(58) Field of Classification Search
USPC .................... 398/45–51, 54, 57, 76
See application file for complete search history.

(56) References Cited

U.S. PATENT DOCUMENTS

| | | | |
|---|---|---|---|
| 5,663,820 A * | 9/1997 | Shiragaki | 398/50 |
| 5,956,165 A | 9/1999 | Fee | |
| 5,995,256 A * | 11/1999 | Fee | 398/34 |
| 6,559,984 B1 * | 5/2003 | Lee et al. | 398/5 |
| 7,796,898 B2 | 9/2010 | Armstrong | |
| 2003/0030866 A1 * | 2/2003 | Yoo | 359/128 |
| 2006/0008273 A1 * | 1/2006 | Xue et al. | 398/51 |
| 2010/0008242 A1 | 1/2010 | Schein | |
| 2010/0080571 A1 | 4/2010 | Akiyama | |

* cited by examiner

*Primary Examiner* — Dalzid Singh
(74) *Attorney, Agent, or Firm* — Spencer Fane Britt & Browne LLP (57) ABSTRACT

The present invention provides reduced power dissipation and other benefits at the optical transport network layer by utilizing a digital subcarrier optical network comprising multiple digital subcarrier cross-connect switches. This offers several advantages for optical networks, including spectral efficiency and robustness against signal corruption and consumption of less energy than traditional TDM-based electric switches (OTN/SONET/SDH).

35 Claims, 10 Drawing Sheets

(2 of 10 Drawing Sheet(s) Filed in Color)

PRIOR ART

DIGITAL SUBCARRIER OPTICAL NETWORK UTILIZING DIGITAL SUBCARRIER CROSS-CONNECTS WITH INCREASED ENERGY EFFICIENCY

RELATED APPLICATIONS

The present U.S. non-provisional patent application is related to and claims priority benefit of an earlier-filed provisional patent application titled POWER EFFICIENT OPTICAL NETWORK CROSS-CONNECT BASED ON FREQUENCY-DIVISION MULTIPLEXING AND RF SWITCHING, Ser. No. 61/424,581, filed Dec. 17, 2010. The identified earlier-filed application is hereby incorporated by reference into the present application as though fully set forth herein.

BACKGROUND OF THE INVENTION

1. Technical Field

The present disclosed technology relates generally to communication networks, and, more specifically, to Optical Transport Networks as designated by the International Telecommunication Union.

2. Background

Optical networks are connected through optical fibers with elements capable of providing optical channel transport, multiplexing, routing, management of the network, supervision, and redundancy for survivability. Many telecommunications and data carriers around the world are increasingly using Optical Transport Networks (OTN) for their long-haul and metro-area networks. OTN is growing faster than Synchronous Optical Networking and Synchronous Digital Hierarchy (SONET/SDH) and has the potential of boosting bandwidth and increasing networking functionality.

Optical networks utilize optical fibers and lasers or highly coherent light from light-emitting diodes to transfer multiple digital bit streams of data over the network. SONET/SDH was originally designed to replace Plesiochronous Digital Hierarchy (PDH) which was used to transport large amounts of telephone calls and data traffic over the same fiber without synchronization problems. PDH used circuit-switching and was efficient if the sources of the transmissions through the circuits were synchronized. However, as these optical networks continued to grow, so did the traffic on them. SONET and SDH, a superset of SONET, were developed to support real-time, uncompressed, circuit-switched, voice-encoded data. SONET/SDH allows for simultaneously transporting many different circuits of differing origin using a single framing protocol, and is ideal for transporting Asynchronous Transfer Mode (ATM) frames, Internet protocol (IP) packets, or Ethernet frames. Generally, a frame is a group of data bits in a specific format (ATM, Ethernet, IP and others) with a flag at the beginning and the end of the data bits to define the individual frame.

The message protocols transported by SONET and SDH are similar with a few exceptions. SONET is typically used in North America whereas SDH is widely used throughout the world. The protocol of SONET/SDH is a multiplexed structure wherein a header is interleaved between the data to permit the encapsulated data to have its own unique frame rate and be present within the SONET/SDH frame structure and rate. The protocols buffer data during transit for at least one frame before sending. This buffering allows for multiplexed data to move within the overall framing (transmission) to compensate for different frame rates. The protocol becomes more complex based on when and where in the data stream padding is needed and at what level of the multiplexing structure.

In optical networks, SONET/SDH routers and multiplexers have high power consumption, and with increased demand for these networks for industry, public works, school, and residential use, energy usage increases. The networking community's energy saving object is becoming more important now that Internet traffic is expected to continue steep growth driven by video applications and cloud computing advances.

Energy consumption is a consideration in designing communication networks including hardware, routers and multiplexers, and architecture. For example, Internet Protocol (IP) routers can lower their packet processing rate when traffic volume is low to reduce energy consumption in both optical and electrical networks. All-optical Wavelength Division Multiplexing (WDM) networks can be made more energy efficient by bypassing the optical-electrical-optical conversion at the intermediate optical cross-connection nodes. One layer of the communication networks where increased energy efficiency is desirable in current and future networks is in the third network layer, the OTN. The OTN layer is often used between the IP and the WDM layer to provide sub-wavelength capacity to the links of routers. Present day OTN solutions perform similar to SONET/SDH and perform digital time division multiplexing of multiple sub-wavelength channels to fill out the entire wavelength of a channel. Each sub-wavelength channel is individually routed using digital cross-connects (DXC), and each DXC requires approximately 10 Watts per 10 Gigabits of carried data to perform transport functionalities. As the energy consumption of telecommunications networks is forecasted to double within one decade due to the rapid increase of traffic volume in broadband networks, combined with the expectation of higher energy prices and increasing concerns about global warming, finding energy-efficient solutions becomes an important issue for telecommunications networks.

At the IP layer, energy-aware packet forwarding techniques suggest that smaller IP packets increase the energy consumption of routers, so optimizing the size of IP packets can make routers more energy efficient. However, reducing switching delay and lowering energy consumption need to be carefully balanced. New network architecture comprising two parallel networks have been proposed. A "super-highway" network using pipeline forwarding for IP packets would be used in conjunction with the current Internet which carries traditional traffic and signaling between routers that set up synchronous pipes in super-highway networks. The super-highway would carry traffic that has deterministic patterns and require high bandwidth.

In WDM networks, high energy consumption originates from the optical network equipment which is used for traffic grooming. Hence, energy-efficient traffic grooming, which reduces the number of required lightpaths, considerably increases energy savings. Other approaches to reduce energy consumption include using routing and wavelength assignment heuristics that minimize the number of lightpath interfaces and using digital signal processing for wavelength translation of the frequencies of each specific wavelength on the optical fiber. However, this process may be cost prohibitive due to the expense of the optical equipment needed to create the wavelength translation. Other possible solutions include reducing energy consumption of each network operation by performing dynamic traffic grooming.

Current telecommunications networks are based on an architectural model involving three classes of network domains: core, metro, and access. In core networks, efforts to reduce energy consumption can be divided into two categories: energy-efficient network design and energy-efficient network operations. The energy consumption of IP routers, EDFAs, and transponders is jointly minimized for an IP-over-WDM network by utilizing Mixed Line Rates (MLR). Likewise, shutting down idle network elements saves energy. To identify the maximum number of idle nodes and links while still supporting the ongoing traffic, a Mixed Integer Linear Program (MILP) model can be used to reduce the powered nodes (or equipment) during off-peak hours and during traffic fluctuations throughout the day. Similarly, idle line cards can be shut down when traffic load is low, while keeping the physical topology invariant, to reduce power needs. "Green Routing" has been proposed which uses energy consumption of network equipment as the optimization objective. Also, greater attention is being paid to renewable energy. One idea to reduce carbon footprint is to establish core servers, switches, and data centers at locations where renewable energy can be found, and then to route traffic to the "green areas".

Wireless-Optical Broadband Access Network (WOBAN) is a novel access architecture, and can provide high-bandwidth services. Energy savings in the optical part of WOBAN by sleeping mechanism has been studied, and energy-efficient design of a unidirectional WDM ring network has been investigated.

Energy-efficiency is a major problem for data centers, which are vital to support today's data applications. Optical networks play an important role in both data center inter- and intra-connections. An approach to reducing the energy consumption of high-speed intra-connection (inside data centers) links has been studied. Load distribution across data centers in different locations is also related with power-conservation. How to optimally distribute requests has also been studied.

Solutions based on frequency division multiplexing (FDM) were widely used in the pre-SONET/SDH era, to multiplex transport channels together using spectral diversity. These transport solutions were then abandoned, RF/microwave in fiber optics is still in use to carry radio signals between antennas and base station, due in part to their low spectral efficiency and with the advent of TDM and synchronous transmission techniques, such as SONET and SDH. Another problem of traditional FDM (or SCM), being analog systems, is their susceptibility to accumulated waveform distortion and crosstalk. For these reasons FDM is not a competitive solution for large-scale optical networks. As an extension of SCM, Orthogonal Frequency Division Multiplexing (OFDM) introduces orthogonality between adjacent subcarrier channels, so that no guard band is required between adjacent channels, which maximizes optical bandwidth efficiency.

SUMMARY OF THE INVENTION

The present invention provides reduced power dissipation at the OTN layer by utilizing OFDM technology executed on an OFDM cross-connect architecture. OFDM has advantages for wireless communications due to its spectral efficiency and robustness against signal corruption. With advances in digital CMOS electronics and the increased use of optical networks, the present invention can be used to perform the same transport functions as existing DXCs while reducing energy consumption of the OTN layer by an order of magnitude. Energy consumption is also reduced by efficiently designing the network routing and resource assignment algorithms using OFDM cross-connect functionalities, including routing frequency assignment (RFA) algorithms.

The OFDM cross-connect architecture of the present invention may also be used to lower the power consumption of existing communication networks by introducing it in various network segments. For example, packet transport networks make use of Multiprotocol Label Switching-Transport Protocol (MPLS-TP) routers to create virtual circuits and these networks consume power at the approximate level of OTN. The reduction in power consumption of the OTN layer may assist in the expansion of communication, Internet, and education services to economically depressed area. Likewise, these low power-consuming OFDM cross-connect nodes or "routers" can be powered by renewable energy such as solar cells or wind generators.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings constitute a part of this specification and include exemplary embodiments of the disclosed subject matter illustrating various objects and features thereof, wherein like references are generally numbered alike in the several views.

DETAILED DESCRIPTION

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right, and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. This terminology will include the words specifically mentioned, derivatives thereof, and words of similar meaning.

Figure 1:
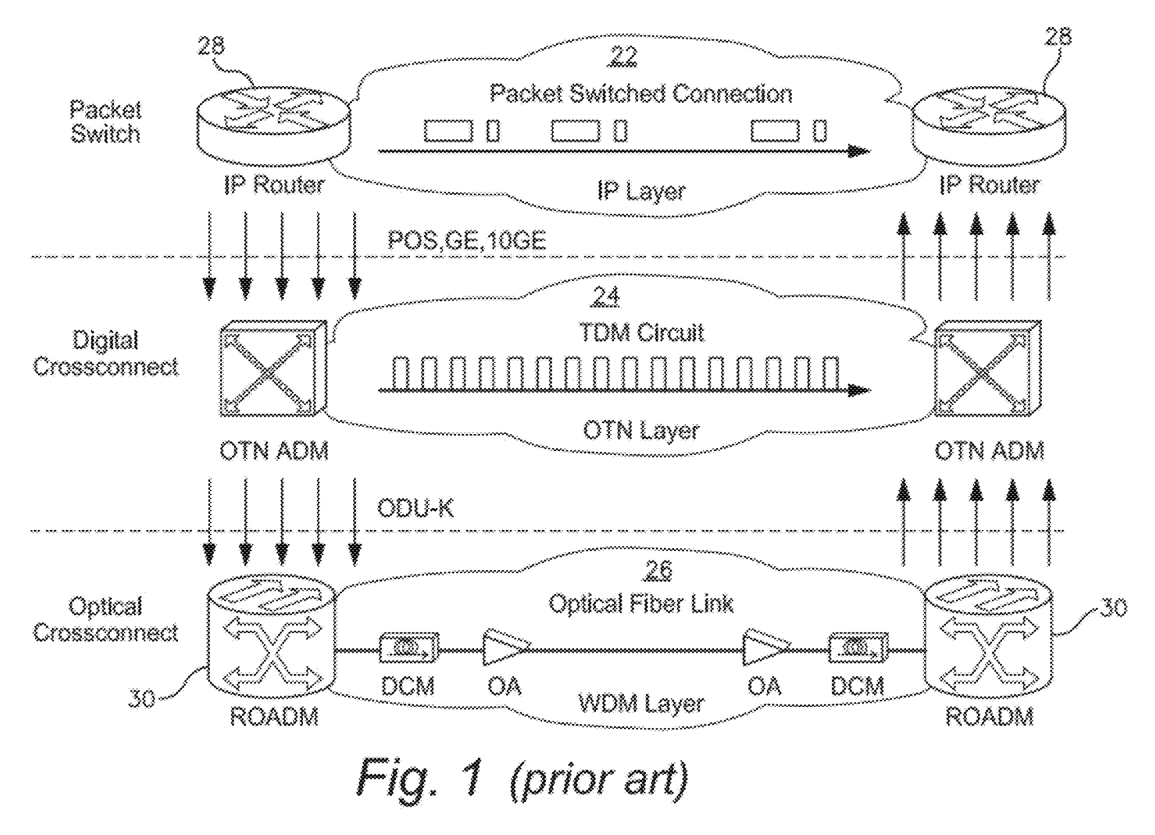
FIG. 1 (PRIOR ART) is a diagram of three layers of a prior art network using an Internet Protocol (IP) layer, an Optical Transport Network (OTN) layer, and a Wavelength Division Multiplexing (WDM) layer.

Current telecommunications networks rely on multiple technologies to send and route optical or electrical signals to a desired location. Referring to FIG. 1, a prior art multilayer network 20 has an Internet Protocol (IP) layer 22 which utilizes a packet switched connection, an OTN layer 24 which utilizes a DXC switch, and a WDM layer 26 which has an optical fiber link. Internet Protocol (IP) routers 28 offer packet switching control, achieving efficient statistical multiplexing of the available network resources across the user population. Optical layer cross-connects (OXC) 30 offer wavelength (or lambda) switching, i.e., lightpaths or circuits of light can be switched end-to-end across the optical network layer 26. The capacity of the optical circuit is fixed and set to the transmission rate available at the physical (fiber optics) layer, e.g., 10 Gb/s, 40 Gb/s, or 100 Gb/s. Traffic grooming, a circuit that receives data bits and routes the data to the designed destination, is provided by the OTN layer 24 placed between the IP layer 22 and the optical layer 26 to offer fine bandwidth granularity to the links of the routers 28.

Figure 2:
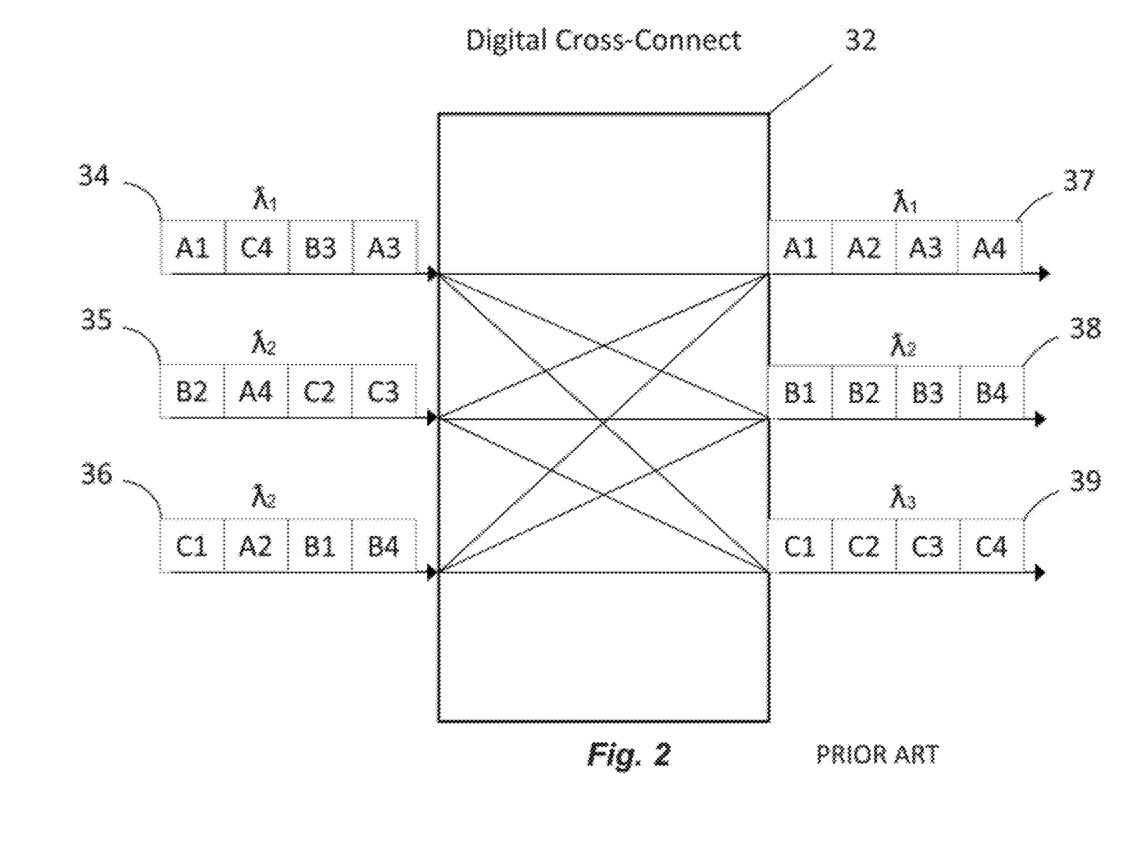
FIG. 2 (PRIOR ART) is a block diagram representing a prior art digital cross-connect switch.

Referring to FIG. 2, current OTNs (such as SONET/SDH) using DXCs utilize time division multiplexing (TDM) circuit switching. TDM circuit switching is used to create end-to-end circuits with sub-wavelength bandwidth granularities and can be provisioned to interconnect routers or other add-drop multiplexing devices. The capacity of the OTN circuits is fixed and set to standard rates, e.g., 0.625, 2.5, or 10 Gb/s. As shown in FIG. 2, DXC switch 32 receives data frames along three input ports 34,35,36. Each port receives the data frames transmitted on either an input fiber or on a wavelength of an input fiber, lambda1, lambda2, lambda3. The DXC switch 32 monitors each arriving data frame, reads the header of the frame and directs the frame to the correct output fiber 37,38;39. FIG. 2 illustrates the complexity of the DXC switch 32 and the need for time padding or buffering to receive, read, and re-order the data frames before sending them to the correct output port.

Figure 3:
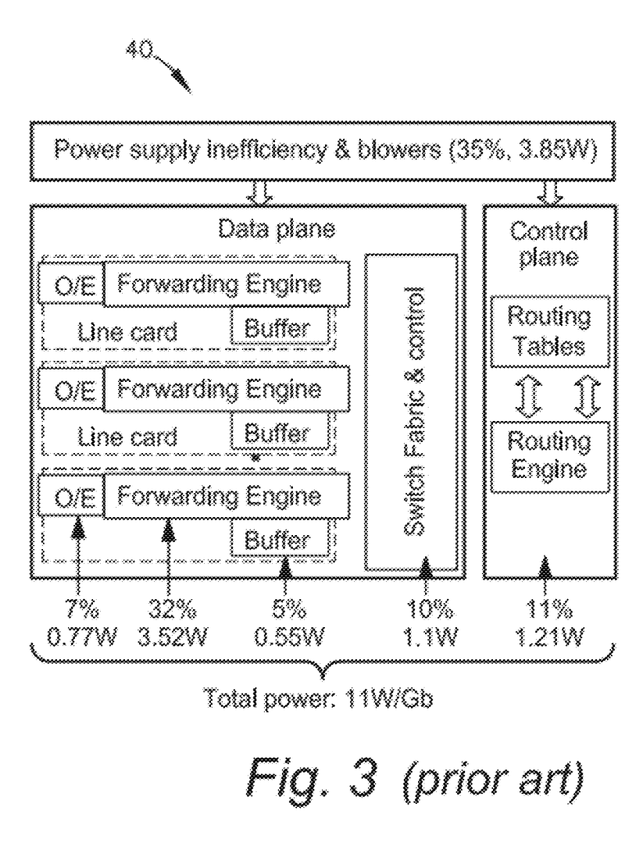
FIG. 3 (PRIOR ART) is a block diagram illustrating a typical power usage of a prior art electronic router.

FIG. 3 is a graphical representation of energy consumption (Watts per Gb of data) for a typical electronic router 40. The packet switch and control plane consume 10% and 11% respectively. An estimated 35% of the overall energy consumption is due to cooling, such as blowers and fans, and circuit inefficiency.

Another available transport option is MPLS Transport Profile (MPLS-TP). MPLS-TP is a profile of MPLS, which is designed for use as a network layer technology in transport networks. It is a connection-oriented packet-switched (CO-PS) solution and offers a dedicated MPLS implementation by adding mechanisms that provide support of critical transport functionality. MPLS-TP is to be based on the same architectural principles of layered networking that are used in long-standing transport network technologies like SDH, SONET, and OTN.

In general, the IP routers are the most flexible and most expensive solution that is used in the access and at the edge of the core network where packets are classified at the ingress IP router and sent over pre-provisioned circuits to reach the egress IP router. The OXCs offer a cost effective solution with fast protection schemes (5-9 s reliability). However, they can only offer end-to-end optical circuits with the large granularity of an entire wavelength channel (e.g., 10, 40, or 100 Gbps). Both OTN DXCs and MPLS-TP routers are existing technologies offering end-to-end circuits across the core network with fixed (the former) or variable (the latter) capacity, that achieve sub-wavelength bandwidth granularity, along with fast protection schemes (5-9 s) and cost per switched byte of data that is favorable compared to IP routers. From a power consumption stand point, electronic processing of transported data—which is required in both OTN DXC and IP MPLS-TP routers—consumes significantly higher electrical energy compared to optical circuit switching performed by OXC.

Solutions have been proposed that reduce power consumption in a number of network architectures. The most effective of these solutions targets IP/MPLS routers, recommending a reduction of the packet rate processed in the router or even the complete switching off of some IO cards at day times when the offered load is relatively low in the network. In the optical domain, energy consumption is already relatively low compared to the electronic layer, and can be further reduced by switching off an entire wavelength channel, or even the full set of wavelength channels of a single fiber, which allows the in-line fiber amplifiers to be switched off during low traffic periods. However, these recent solutions do not address the power consumption that takes place in the transport network. In fact they do not even reduce the power consumption that is required to maintain the wavelength transmission link between fully functional nodes, besides offering the transmission card switch on/off option already mentioned.

Figure 4:
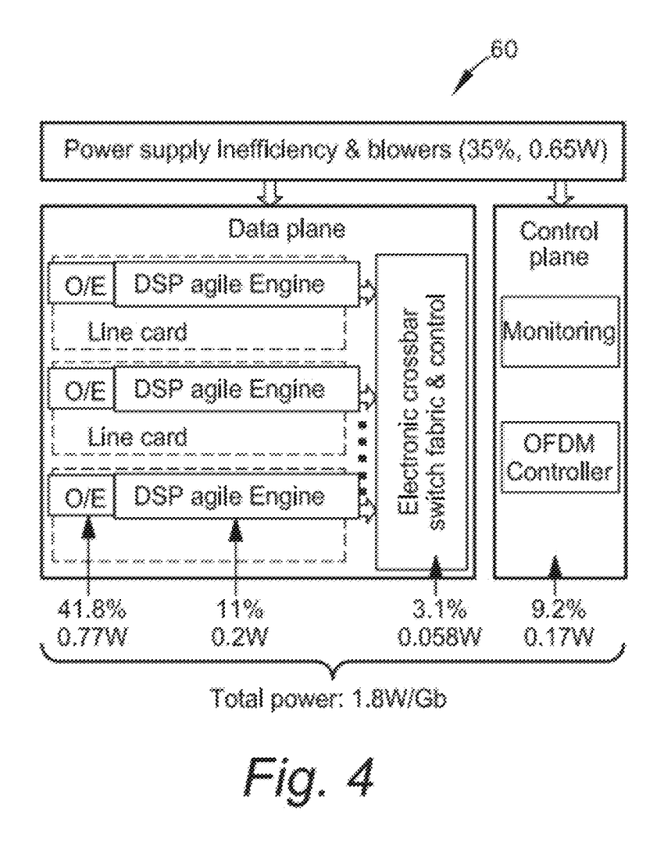
FIG. 4 is a block diagram illustrating a typical power usage of an optical circuit switch of the present invention.
Figure 5:
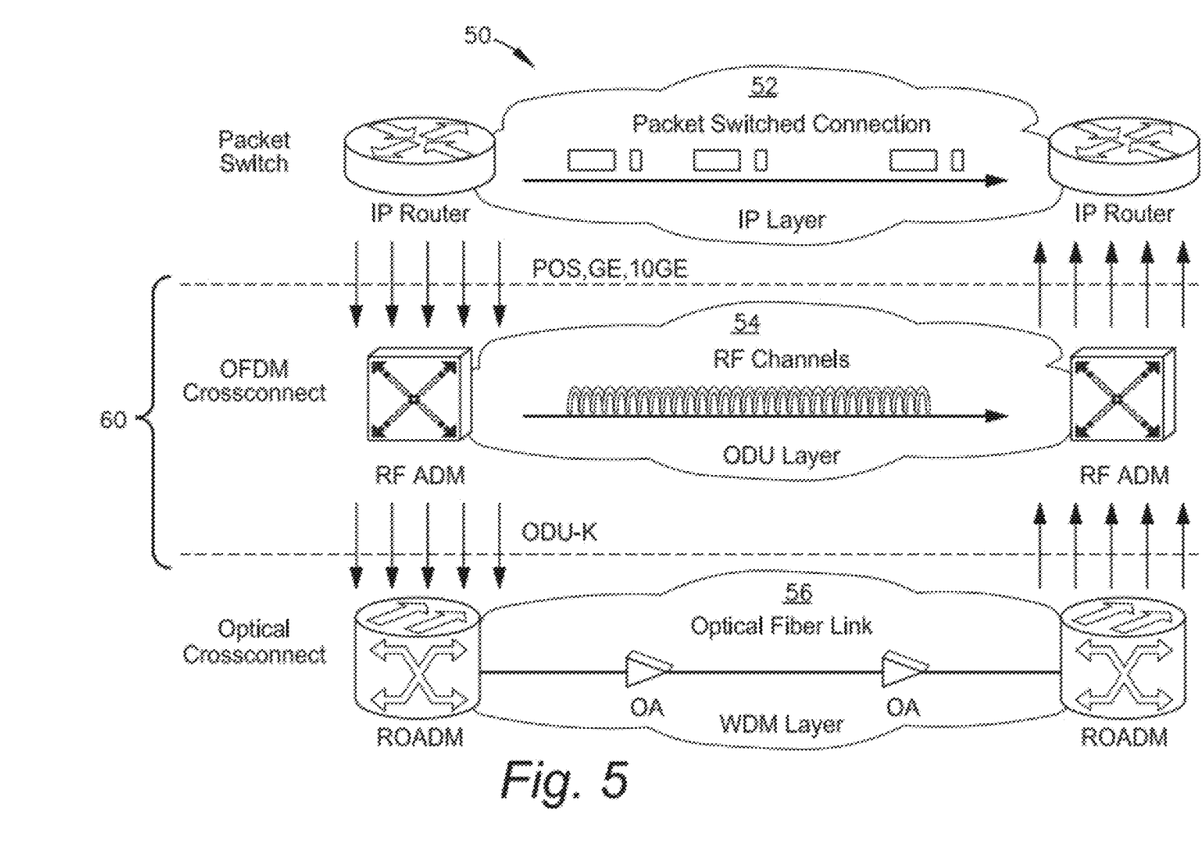
FIG. 5 is an illustration of a digital subcarrier optical network structure of the present invention.
Figure 6:
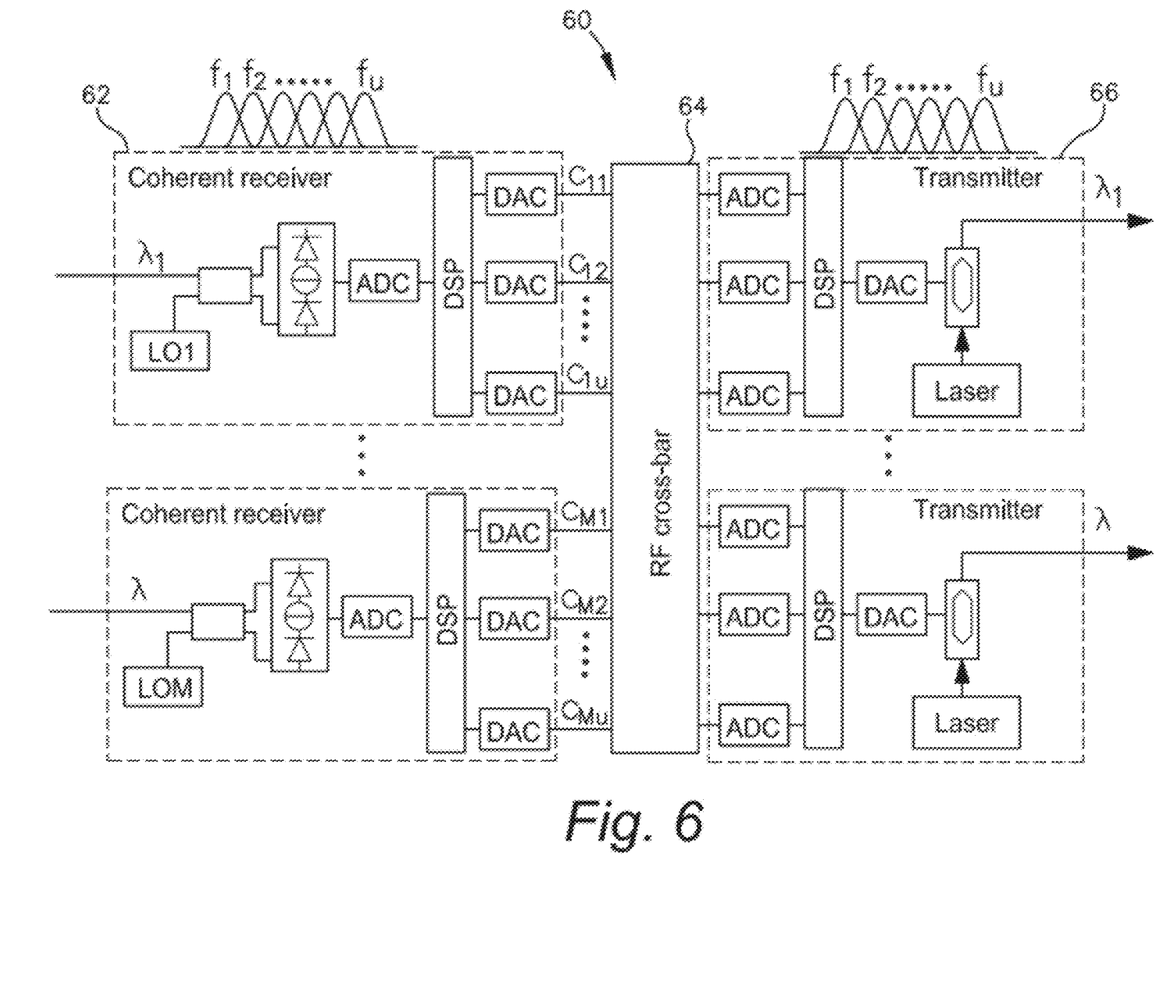
FIG. 6 is an illustration of a digital subcarrier cross-connect architecture and coherent transceivers of the present invention.

Referring to FIGS. 5 and 6, a multilayer network 50 of the present invention has an IP layer 52, a digital subcarrier optical network (DSON) layer 54, and a WDM layer 56, wherein, in the OTN layer 54, the present invention replaces TDM-based OTN/SONET/SDH with OFDM and provides an innovative digital subcarrier cross-connect architecture 60 (based on sub-wavelength frequencies that are orthogonal, hence the given name "FOXC") that will significantly decrease the power consumption at this layer while maintaining good spectral efficiency, channel granularity, data rate flexibility, and circuit switching speed. Switching and routing of sub-wavelength channels is performed in the frequency domain (rather than time domain) using orthogonal subcarrier channels. More specifically, the present invention has the potential to (1) significantly reduce power consumption at the cross-connect by using a circuit switch architecture which eliminates both the forwarding engine and the packet buffering of current transport solutions, and reduces power consumption at the cross-bar switch, as shown in FIG. 4, and (2) offer an adjustable transmission (line) rate at the sub-wavelength level (rather than the wavelength level) using fast electronic-domain switching (as opposed to all-optical switching in WDM) to more efficiently support the offered amount of traffic with the minimum required energy consumption of the transceivers. It will be appreciated that the components of the DSON can be used for various other applications. Moreover, the DSXC architecture can be fabricated in various sizes and from a wide range of suitable materials, using various manufacturing and fabrication techniques.

Primary points of high electrical power consumption in routers are the forwarding engine, digital buffer, and packet switch fabric, while for DXCs they are I/O buffers and line cards. FOXC makes use of subcarrier multiplexing (SCM), a technology which multiplexes a large number of low data rate subcarrier channels into a high capacity wavelength channel. Each subcarrier channel carries data intended for its own destination. In a manner similar to an OXC, the FOXC crossbar switch sets up static traffic paths from input to output ports, and a low consumption crossbar switch performs cross-connection operation. Both the forwarding engine and the digital buffer are eliminated in the FOXC circuit switch architecture 60. Digital signal processing (DSP) is used to perform OFDM at high data rates. FIG. 4 shows the projected power consumption distribution across the FOXC modules 60, which can be directly compared to the consumption of the electronic router modules shown in FIG. 3. The reported consumption of each module in FOXC is based on available data sheets, anticipated power consumption for the control plane based on today's OTN control plane products, blowers, and power inefficiency levels that are similar to those of already existing networking equipment. The overall power consumption of FOXC is projected to be around 1.8 W/Gb, which offers a reduction factor of 5 compared to the ~10 W/Gb of both core IP routers and SONET equipment.

In addition to reducing energy consumption, the OFDM transport architecture 54 of the present invention offers the following additional advantages (which are discussed in detail below): high spectral efficiency when compared to traditional SCM solutions, due to the orthogonality between subcarrier channels, which can offer thousands of channels in a single fiber; fast switching speed using an electronic crossbar switch when compared to an all-optical switch; signal robustness against optical transmission impairment, which may entirely circumvent the use of dispersion and PMD compensators in the optical layer; direct access to individual subcarrier channels for traffic monitoring and add/drop functionalities, with line rates that span from 1 Gbps to 100 Gbps; common functionality of the DSON layer 54, e.g., fast protection switching and rerouting of subcarrier channels upon network element failure detection; fast provisioning and switching of subcarrier circuits (~100 ns) in the FOXC 60 and without being adversely affected by the signal transient instability that may originate in the optical layer; and flexible data rate of each subcarrier to support a variety of concurrent bandwidth/capacity requirements.

OFDM has made multiple significant impacts in wireless communications and related networking products due to its good spectral efficiency and robustness against noise and crosstalk. In addition to high spectral efficiency, OFDM in optical systems is also insensitive to various transmission impairments such as chromatic dispersion and polarization mode dispersion (PMD).

FOXC has the potential to offer thousands of channels per fiber, sub-millisecond switching time, and less than 2 W/Gb power consumption. In comparison to packet switched cross-connects, circuit switching requires much less electric power. In a similar manner to OXC, FOXC only needs to set up static paths across a crossbar switch, thus power consumption is minimal.

In conventional WDM and SCM systems, adjacent channels must be separated by a guard band to avoid inter-channel crosstalk, and therefore the optical bandwidth is not fully utilized. In an OFDM system, frequency spacing between subcarriers is equal to the data rate carried by each channel, and spectral overlap is allowed. Digital integration over a bit period removes inter-channel crosstalk. Advanced DSP algorithms also allow for the compensation of various transmission impairments such as chromatic dispersion and PMD.

By virtue of the distinct OFDM subcarrier channels (each with sub-wavelength bandwidth granularity) carried by the optical signal, cross-connection operations of such channels are facilitated as follows. Referring to FIG. 6, the FOXC architecture 60 and operating principle is illustrated wherein each wavelength signal carries u orthogonal subcarrier channels. An OFDM receiver 62 detects the incoming optical signal at lambda; and decomposes it into u baseband RF outputs $ci1, ci2, \ldots ciu$. Data packets on each subcarrier are arranged such that they all have the same destination node, and therefore, each subcarrier channel does not have to be decomposed into individual packets (which would require buffering and re-grouping operations as in a TDM cross-connect). If there are W wavelength channels coming into and departing from the FOXC, the RF crossbar circuit-switch 64 can perform the desired cross-connection. After the crossbar switch 64, each subcarrier is sent to a transmitter 66, assigned a new frequency, and regrouped according to the destination, and modulated on to an outgoing wavelength signal.

The use of electronic processing to replace optical domain dispersion and PMD compensation has become an industry standard. CMOS electrical signal processing capabilities built into commercial optical transceivers can be utilized to perform OFDM operation. In addition, coherent detection has also become practical and adopted by the telecommunications industry. As an example, an off-the-shelf coherent 46 Gbps QPSK transceiver equipped with DSP Agile engine consumes approximately 80 W power. With proper modification, ADC, DAC, and DSP in this type of digital optical transceiver can be readily reconfigured to perform OFDM operation. The embodiment of the present invention shown in FIG. 6 incorporates FOXC using digital transceivers based on coherent detection. A distinct advantage of using digital transceivers is that the accumulation of noise, crosstalk, and distortion can be avoided, which is critical in multi-hop optical networks with multiple cross-connection nodes. Cross-connect switching in the electronic domain and on the subcarrier level ensures the speed, the flexibility, and the granularity.

In a traditional OFDM system, the data stream is first mapped into a 2-D array row-by-row, and an IFFT is performed such that each column becomes a subcarrier channel. In this way an OFDM symbol is usually partitioned into different subcarriers. In the corresponding OFDM receiver, an FFT process is used to convert the 2-D data array back into frequency domain and the original digital signal is reconstructed through parallel to serial conversion. In this process, it is not convenient to select a subset of subcarriers without detecting the entire OFDM frame. The OFDM transceiver in the cross-connect architecture of the present invention allows for the selection of individual subcarrier channels. In this case, each input data stream is directly mapped onto a subcarrier, and no FFT is required in the receiver. When the symbols on subcarriers are mutually time-synchronized, the crosstalk between then can be eliminated through integration over a bit period. Because this OFDM transceiver is not based on FFT, it can be simply regarded as digital subcarrier multiplexing (DSCM).

Figure 7:
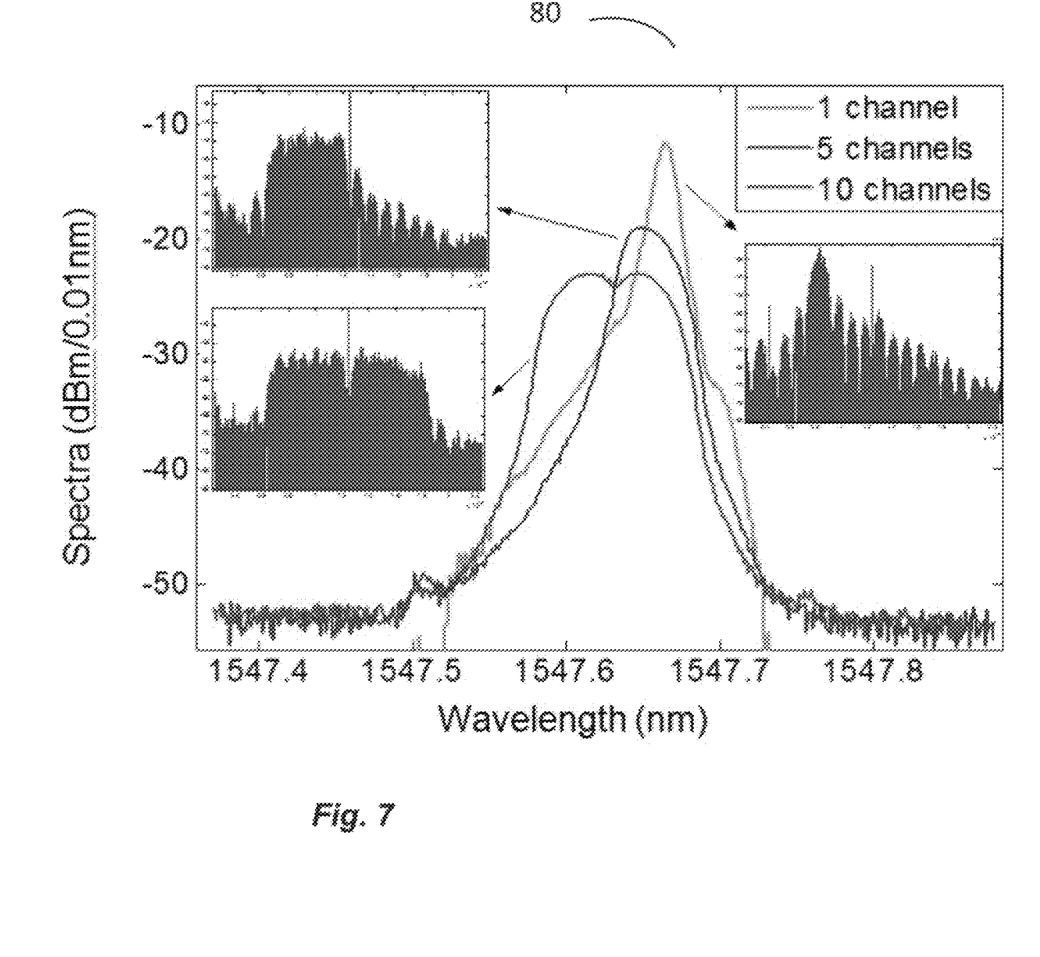
FIG. 7 is a graphical representation of the optical spectra of orthogonal frequency division multiplexer (OFDM) signals with C1, C5, and C10 subcarrier channels each carrying a 2 Gb/s QPSK signal.
Figure 8:
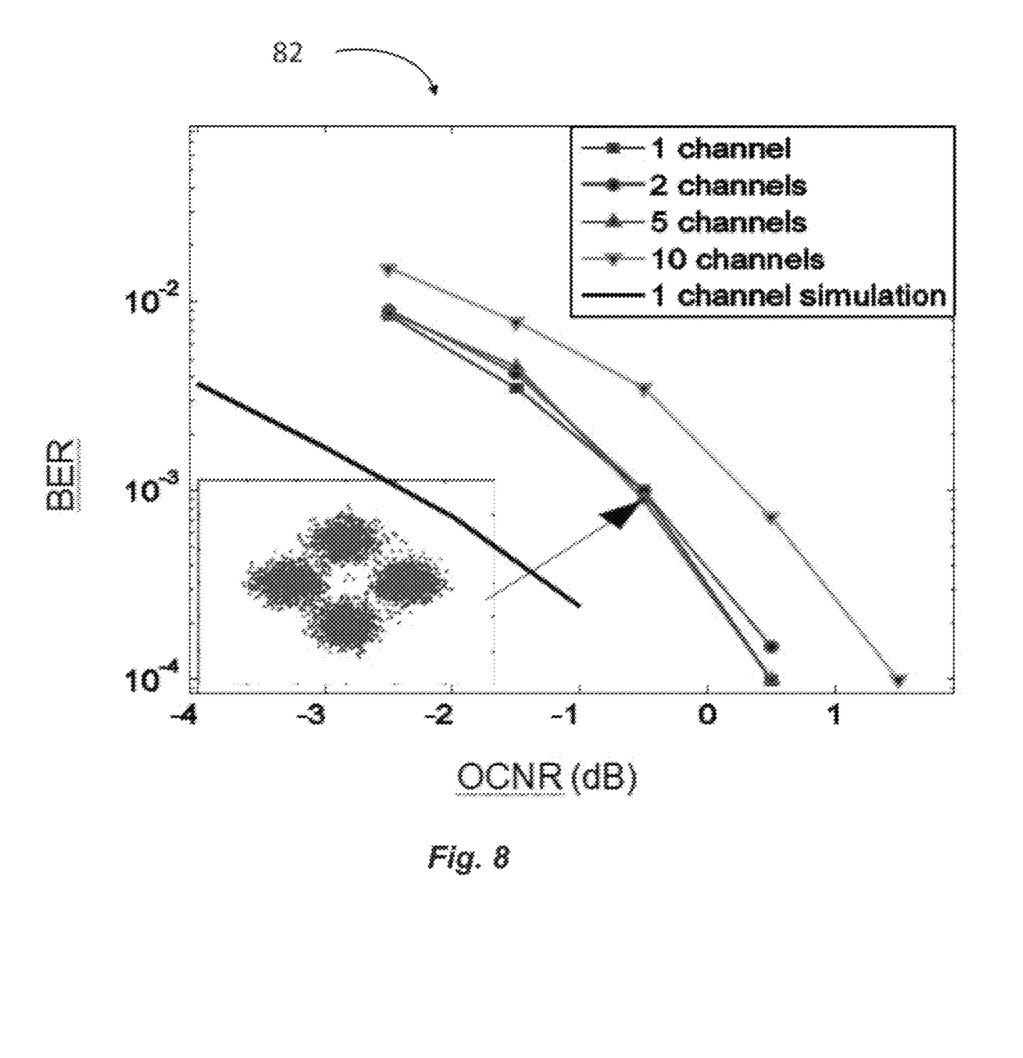
FIG. 8 is a graphic representation of a system BER versus optical-to-noise-ratio for the signals carried in subcarrier channels C1, C5, and C10.

In one example implementation of the present invention, a CIENA 10 Gbps eDCO transceiver, originally designed for electronic domain dispersion compensation, was reconfigured into an OFDM transmitter. This transmitter has an onboard 22 Gs/s DAC with digital interface, and an IQ modulator was added to enable both intensity and phase modulation. At the receiver, any subcarrier channel can be selected by tuning the wavelength of the local oscillator (LO). A 90° optical hybrid was used before the photo detector to separate the I and Q components. 75 km standard single-mode fiber was used between the transmitter and the receiver. FIG. 7 shows an example of the measured optical spectra SO of DSCM signals with C1, CS, and C10 subcarriers each carrying 2 Gbps QPSK data. The total optical bandwidth on this wavelength is 10 GHz, and the total data rate is 20 Gbps. FIG. 8 shows the measured BER vs. optical carrier-to-noise ratio (OCNR) 82 with different numbers of channels. There is negligible increase of OCNR penalty when the number of subcarrier channels increases from 1 to 5 where all 5 subcarrier channels are located on the lower sideband with respect to the center optical carrier. When the other 5 subcarrier channels on the upper sideband of the spectrum are added to make the total number of channels 10, an approximately 1 dB OCNR penalty is introduced. This can be partly attributed to the imperfect sideband suppression in the single-sideband modulation process. While there is negligible OCNR degradation introduced by the 75 km transmission fiber, the 1.5 dB OCNR degradation of the measured BER when compared to the numerical simulation of the same system can be attributed to pass-band ripples in the RF amplifiers, multi-pass reflections in the optical system, and time jitter in the receiver.

Figure 9:
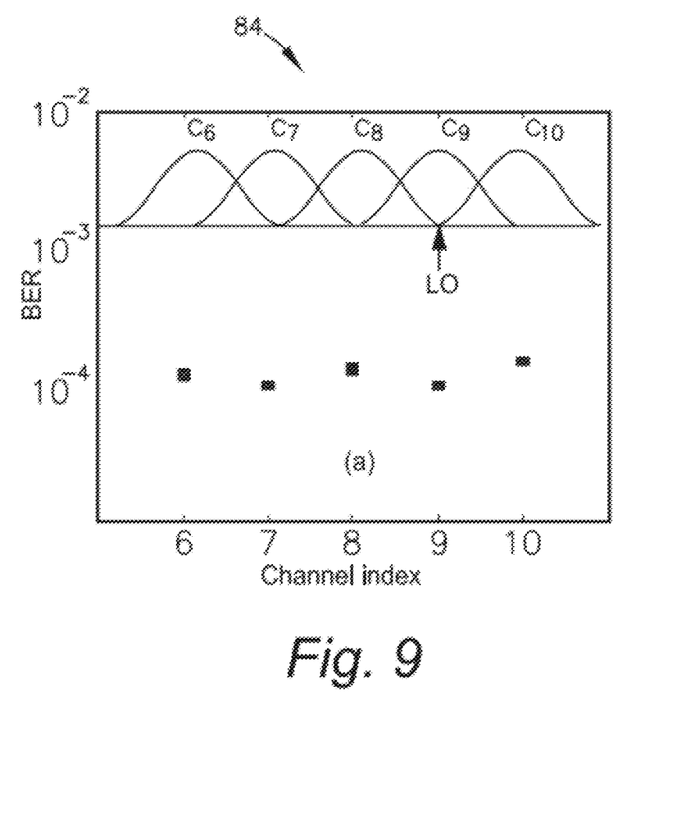
FIG. 9 is a graph of BER values for simultaneous detection of channels C6 through C10 when a local oscillator is set at the central frequency of channel C9.
Figure 10:
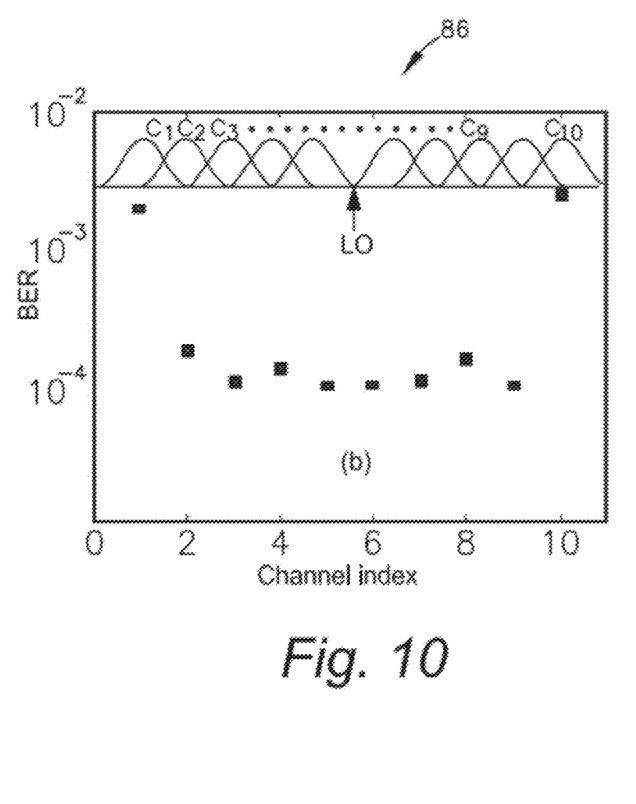
FIG. 10 is a graph of results when the local oscillator wavelength is set to the center of the signal optical carrier in an attempt to detect all ten subcarrier channels.
Figure 11:
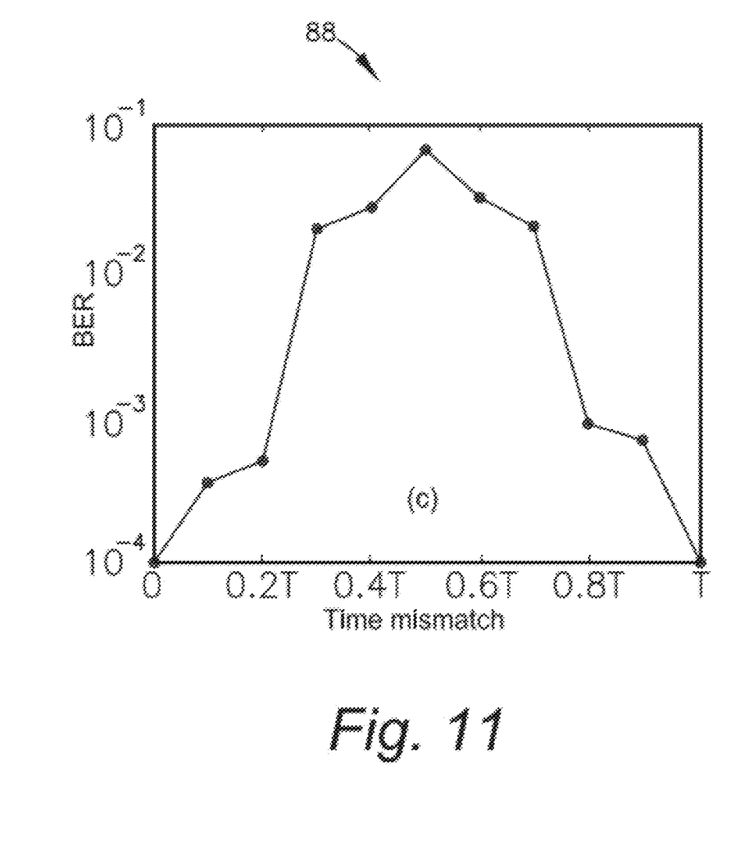
FIG. 11 is a graph of the impact of bit time synchronization between adjacent subcarrier channels.

This DSCM system is highly flexible because the receiver can select any one or multiple subcarriers without changing the transceiver hardware. Channel selection is achieved by tuning the optical LO to the desired subcarrier frequency in the received optical spectrum, and coherent IQ detection translates the optical spectrum to the electrical domain. All subcarrier channels within the receiver electrical bandwidth can be detected individually and crosstalk between them can be removed through digital processing. FIG. 9 shows the simultaneous detection 84 of channels C6 through C10 when the LO was set at the central frequency of channel C9. The BER is measured using an OCNR of 1.5 dB. No significant performance variation was found among these channels. FIG. 10 shows results 86 when the local oscillator wavelength was set to the center of the signal optical carrier in an attempt to detect all ten subcarrier channels. The results show reasonably uniform BER performance except for the two outmost channels C1 and C10. The increased BER in these two channels is due to the bandwidth limit of the particular receiver which is only 6 GHz, thus the spectra of channel C1 and C10 are already partially outside the receiver bandwidth. The impact 88 of bit time synchronization between adjacent subcarrier channels is shown in FIG. 11. Bit time misalignment may be kept below ±20% of the bit length T to avoid significant BER degradation.

DSCM is a generalized form of OFDM in which digital electronics are used in the transmitter to generate coherent subcarriers, and each subcarrier carries an independent data stream. In comparison to optically generated subcarriers, it is easier to ensure precise frequency spacing between subcarriers when they are generated digitally.

In the FOXC cross-connect illustrated in FIG. 6, data bits carried by different wavelengths may not be synchronized. If the RF switch fabric does not provide a retiming function after the switch and regrouping, bit-time misalignment between adjacent subcarrier channels may cause BER degradation, as indicated in FIG. 11. In addition, the electrical bandwidth of the OFDM receiver 62 has to be wide enough to include the spectral sidebands of each subcarrier channel, otherwise crosstalk cancelation would be incomplete. Narrowband Nyquist filters may be suitable to spectrally separate subcarrier channels and eliminate the crosstalk. This type of digital filter may not be feasible in the optical domain, but it can be realized in digital electronics. This also eliminates the need for bit-time synchronization.

In the FOXC cross-connect architecture 60, different numbers of subcarrier channels can be bundled together and switched to the same destination. This capability of mixed data rate provides additional flexibility in an optical network. Furthermore, because subcarrier channels are generated digitally, high order modulation formats such as M-PSK and M-ary with M>4 can be used to further improve spectral efficiency if desired.

In addition to DSCM transceivers, another building block in FOXC architecture 60 is the electronic crossbar circuit switch 64. A number of different types of switches exist, including analog RF switches, and regenerative digital switches. The choice depends on the desired number of subcarrier channels, data rate, switching speed, and maturity of the device technologies.

One way to realize a crossbar switch is to use analog RF circuits. For example, a Honeywell HRF-SW1031 1×6 RF switch device consumes approximately 0.1 mW power with 2 GHz bandwidth per port. Six units of 1×6 RF switches can be combined to make a 6×6 cross-connect, consuming 0.6 mW overall. A large scale Shuffle-net with k columns and pk rows can be constructed using 6×6 switch building-blocks (p=6). To support M=pk+1 channels, the required total number of 6×6 switches is N=k pk. If each subcarrier channel has 1 Gbps capacity, a 100 Tbps FOXC will need 105 ports. This requires approximately 9×10$^4$ units of 6×6 RF switches, consuming 54 W quiescent power, which is only 0.54 mW/Gb. Dynamic power consumption, on the other hand, depends on how frequently the switch has to be reconfigured. For RF-based analog switches, the dynamic power is usually negligible. Although analog RF crossbar switches use minimum electrical power, and the power consumption is independent of the data rate of each port, realization of RF crossbar switches with a large port count may be limited by crosstalk and power splitting loss.

With the recent advances in CMOS electronics, large scale crossbar switches based on CMOS circuits have become commercially available. This type of switch provides retiming and reshaping of the signal waveforms, thus compensating for inter-channel crosstalk and power splitting loss. For example, the Vitesse VSC-3140 chip is a non-blocking any-to-any switch with 144 input and 144 output ports. The bandwidth of each port can be as high as 4.2 Gbps with an electrical power consumption of approximately 16 W. Using the switch at full bandwidth, the total chip switching capacity is approximately 600 Gbps and the power efficiency is 26.5 mW/Gb. To scale up switching capability, multiple VSC-3140 chips can be combined to form a multi-stage switch fabric. For example, a 2880×2880 non-blocking switch network can be constructed using 80 VSC-3140 chips arranged in 3 layers (20; 40; 20). In this case, the total switching capacity can reach 10 Tbps with a power efficiency of 100 mW/Gb, which is still two orders of magnitude less than the consumption of the TDM-based DXC.

In the CMOS-based regenerative crossbar switch, the major power consumption is caused by changing the state of the flip-flop representing each data bit, and is, therefore, linearly proportional to the actual traffic volume. Unlike typical TDM-based DXC, this solution does not require memory/buffers and digital shift registers for data handling and re-grouping.

FIG. 4 shows the estimated power consumption of the crossbar switch fabric to be 58 mW/Gb. This result was obtained from the datasheet of the 144×144 Vitesse VSC3144 chip, which consumes 21 W for a total bandwidth of 144·10 Gbps. A larger 2880×2880 switch can be built using three stages of 20:40:20 VSC3144 chips, which provides a total capacity of 28.8 Tbps with 1680 W total consumption (hence the 58 mW/Gb). FOXC architectures can be designed to address even larger cross-connect solutions as illustrated in the following example. Let F be the number of fibers reaching the network node, W the wavelengths per fiber, and O the number of orthogonal frequencies (subcarrier channels) per wavelength. For reasonable values of these three parameters, e.g., F=9, W=40, and O=100, the total number of subcarrier channels available at the node greatly exceeds the 3 stage, 2,880 available crossbar size. A number of crossbar modules are then combined together to cross-connect the whole set of frequencies.

Figure 12:
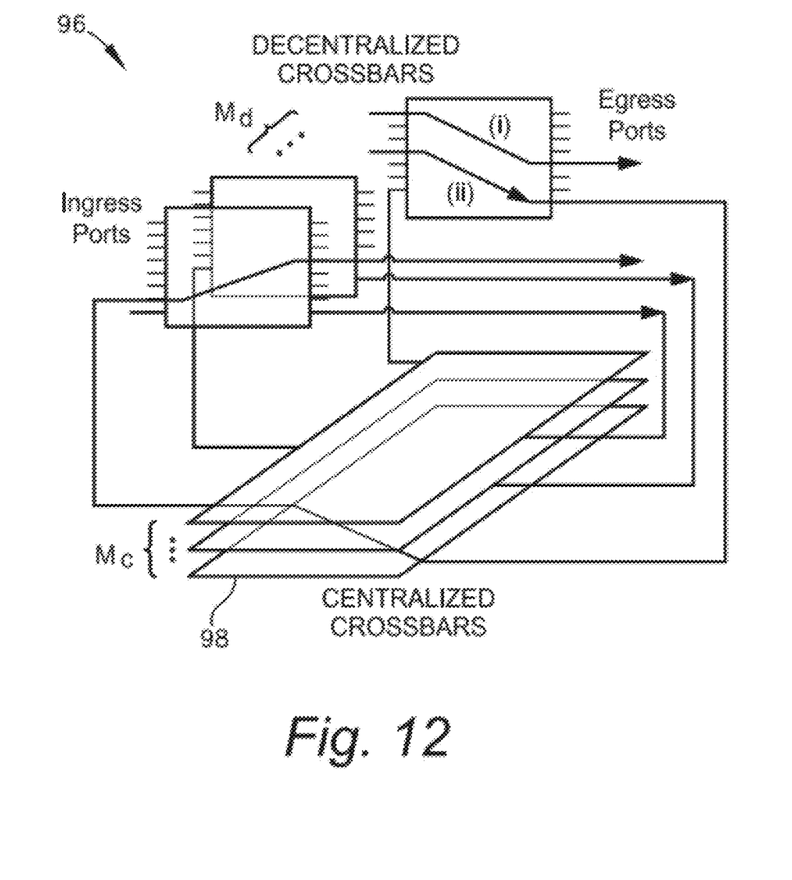
FIG. 12 is an illustration of a crossbar switch of the present invention.

Assume that M crossbar modules are interconnected to form the FOXC as shown in FIG. 12, with Md decentralized modules 96, each connected to Cd incoming and Cd outgoing subcarrier channels, and M−Md=Mc centralized modules 98 being used to interconnect the Md decentralized modules 96. Each centralized module 98 has Cc input ports and Cc output ports. On average, Cc/Md of these ports are assigned to interconnect the centralized module 98 with one decentralized module 96. Note that there are at least two options to cross-connect an incoming subcarrier channel as shown in FIG. 12: (i) both the input port and the output port of the channel belong to the same decentralized module 96, and (ii) the input port and the output port of the channel belong to distinct decentralized modules 96, in which case one centralized module 98 is required to cross-connect the channel from one decentralized module 96 to the other. Option (i) may be is preferred over (ii) as it reduces the total number of crossbar modules required (and the total amount of energy dissipated) in the FOXC. Assuming that the fraction of channels that requires option (ii) is x, the total number of required crossbar modules is approximately:

$$M_c = F \cdot W \cdot O \cdot x / C_c$$

$$M_d = F \cdot W \cdot O \cdot (1+x) / C_d$$

As discussed, at least two options are available when cross-connecting a channel: (i) only one decentralized module 96 is required, or (ii) three modules, one centralized 98 and two decentralized 96 are required. The computation of routing and frequency assignment (RFA) for end-to-end circuit requests is important in ensuring that the value of x (and amount of energy dissipated) is minimized. In some instances, solving the frequency assignment problem is an effort related to finding the solution to the improper coloring of a conflict graph.

Assume that the network is modeled as a graph G(N,L), with N being the set of INI nodes and L being the set of ILI links. Without loss of generality, assume that every node is equipped with the same FOXC architecture 60 shown in FIG. 12. Let D(n,d) indicate the d-th decentralized crossbar module at node n=1, 2, . . . INI. Assume that the decentralized modules 96 are connected via the network links in L to form Md subnets as follows: modules D(n,i) n=1, 2, . . . , INI are interconnected and belong to Subnet i. If the circuit request is routed using only the crossbar modules of one subnet, its assigned subcarrier channel is cross-connected using option (i). If a circuit request is routed using two or more subnets, each time its subcarrier channel changes subnet, option (ii) is implemented at one FOXC node. Assume that the routing of each circuit request is given, i.e., a path consisting of an ordered subset of nodes in N. A conflict graph is then created in which each vertex represents one of the circuits, and a pair of vertices is connected by an edge if the two corresponding circuits share at least one common link in L. The conflict graph can be improperly colored using existing algorithms to assign each vertex a color such that at most k neighboring vertices are colored with the same color, while attempting to minimize the number of required colors overall (the chromatic number of the conflict graph). By choosing k to be the maximum number of subcarrier channels that can be supported by one decentralized crossbar module, all vertices (circuits) colored with color i will be assigned to Subnet i, and the chromatic number will indicate how many subnets (Md) are required to avoid the use of centralized crossbars. A variant of the problem is when Md cannot be as large as the chromatic number of the graph. In which case, the vertices (circuits) colored with any color up to Md will be routed using option (i), and the other circuits will be routed using option (ii), i.e., will make use of two or more subnets and use some centralized crossbars. As a special case (k=1), the problem of minimizing Mc is equivalent to the problem of minimizing the number of wavelength converters when solving the routing and wavelength assignment (RWA) problem for a set of lightpath requests in a WDM network.

A traditional OFDM system developed for wireless communications typically requires IFFT in the transmitter and FFT in the receiver and the entire OFDM frame has to be detected in the receiver before recovering into the original data streams. Another type of OFDM system, known as electro-optic OFDM, makes use of an optical comb generator to create a group of mutually frequency-locked optical carriers. Similar to WDM, electro-optic OFDM is an optical-domain solution as used in SLICE, in which each data channel is encoded into an optical carrier through a dedicated modulator. For a FOXC requiring a large number of subcarrier channels with a relatively low data rate (such as 1 Gbps per channel) for acceptable bandwidth granularity, such an optical-domain technique is not the best solution.

In an optical network, different subcarriers may travel over different distances, and pass through different numbers of network nodes (cross-connect switches) as chosen by the network routing algorithms. This may result in relative delay and difference in data quality. In order to equalize their transmission performance, it may be desirable to apply unequal power provisioning as well as different levels of modulation (such as M-ary) for different subcarriers at cross-connect switch nodes.

From a network standpoint, a cross-connect has to provide fine enough granularity to satisfy users with varying bandwidth demands. With the trend of rapidly increasing capacity demand, SONET cross-connect switches are moving to higher base rates, from OC-3 to OC-12 and even to OC-48, which simplifies the transceiver MUX and DEMUX complexity. Similarly, for the FOXC 60 of the present invention, a higher subcarrier data rate reduces the number of subcarriers for a particular overall capacity. This will help decrease both the required port-count of the switch fabric and FOXC power dissipation. Although a single data rate for all subcarrier channels would imply simple system architecture, mixed data rates will allow for tradeoffs between traffic demand, power dissipation, and system complexity, and thus provide more options when optimizing overall network performance.

A hybrid data rate is possible with OFDM if the data rates are integer multiples of the lowest rate. In this case, bandwidth efficiency may be reduced and the integration at the receiver 62 may have to be performed over the longest bit period. On the other hand, if Nyquist filters are used to spectrally separate subcarrier channels, this integration may not be required, but the digital bandpass filters with sharp edges may require longer delay taps and thereby make CMOS realization more difficult.

Routing and orthogonal frequency assignment (RFA) algorithms will choose which subset of network resources (subcarrier channels) are reserved for the incoming end-to-end circuit requests. The optimal RFA solution is a hard problem (the routing and wavelength assignment (RWA) problem) can be seen as a special case of RFA, and it is known to be NP-hard).

In a partial summary of certain features, the present invention uses OFDM or equivalent digital signal processing to enable spectrally efficient multiplexing capability of orthogonal channels (circuits) in optical communications and networking. Solutions include fiber based networks as well as free space optics (e.g., infrared communications). Individual channels or groups of channels can be independently routed across a network of nodes via specially designed cross-connect nodes. Special Gateway or Add Drop Multiplexing nodes are included to provide the necessary interface for other network technologies to establish and use the channels in the network. The transmission rate can be individually assigned to each channel, thus offering a comb of potential transmission rates end-to-end across the network. Rates may be as low as sub-Gbps and as high as hundreds of Gbps. For comparison, current technologies like OTN, SONET and SDH can only offer ODU-0 (1 Gbps), ODU-1 (2.5 Gbps), ODU-2 (10 Gbps), ODU-3 (40 Gbps), ODU-4 (160 Gbps) and ODU-Flex, with the latter offering products that are ODU-2 or greater. The frequency used for a channel (or the frequencies used for a group of channels) can be changed along the end-to-end path by using the specially designed cross-connect architecture, thus giving more flexibility to routing. The present invention can be used in conjunction with WDM, and the wavelength used to carry the frequency of the channel (or frequencies of a group of channels) can be changed along the end-to-end path by using the cross-connect architecture, thus giving more flexibility to routing. The last two features can be jointly applied to the same channel (or group of channels). With the present invention, network wide time synchronization may not be required as multiplexing is performed in the frequency domain. For comparison, existing solutions are based on time multiplexing, and network wide synchronization is needed, e.g., OTN, SONET, SDH. Channels may be provisioned statically or channels may be set up and torn down dynamically at all possible time scales, down to milliseconds or less. In the cross-connect of the present invention, transmitted data need not be buffered for synchronization and cross-connection purposes, unlike in other solutions, e.g., OTN, SONET, SDH.

Furthermore, the present invention offers end-to-end circuits that can be built across access networks, including Passive Optical Networks (PONs); Local Area Networks (LANs), including enterprise networks; Metro Area Networks (MANs); and across Wide Area Networks (WANs), including WDM networks based on ROADMs. The preceding network types can be combined in all possible permutations. End-to-end channels or circuits can be used to interconnect IP routers, OTN, SONET, SDH nodes, end user equipment, data center (Cloud) network interfaces, enterprise, and residential user equipment. The present invention can be adapted to support unicast, anycast, and multicast traffic, individually or combined. Another aspect of the present invention is that it can be used in conjunction with all types of network management, network control, and network monitoring software, as well as all types of signaling and interfaces in order to set up, tear down, restore, reroute, etc. channels or circuits across the network. All known protection and restoration mechanisms may be applied to the subcarrier circuits, including dedicated protection, shared protection, fast reroute, etc. Power consumption per unit of traffic carried is expected to be lower compared to other electronically based transport network technologies (OTN, SONET, SDH, MPLS-TP). When not in use, part of the electronics in the specially designed cross-connect can be switched off, to reduce power consumption to run the network. The cross-connect architecture can be single stage, or multi-stage to offer scalable solutions. Hierarchical multiplexing may be applied to the present invention, to offer multiple levels of traffic multiplexing. The advantage of hierarchical multiplexing is to offer modular options to span across a large spectrum of transmission rates, ranging from sub-Gbps to hundreds of Gbps.

What is claimed:

1. A method of transporting data along a digital subcarrier optical network from an input port to an output port using a digital subcarrier cross-connect switch, the method comprising:
    (a) monitoring input data traffic of an input port having data units on a first optical fiber having a first wavelength channel;
    (b) separating the first wavelength channel into sub-wavelength channels to create multiple input subcarrier channels;
    (c) directing an input data unit on the optical fiber to an input subcarrier channel having a frequency;
    (d) establishing a static traffic output subcarrier channel having the same frequency as the input subcarrier channel; and
    (e) transferring the input data over the input subcarrier channel to the output subcarrier channel to the output port.

2. The method of claim 1 wherein the step of separating the first wavelength channel into sub-wavelength channels further includes performing orthogonal frequency division multiplexing on the first wavelength channel to create subcarrier channels wherein each subcarrier channel has a unique frequency.

3. The method of claim 1 wherein the frequency of the input subcarrier channel is equal to a transfer data rate on the first wavelength channel.

4. A digital subcarrier optical network using digital subcarrier cross-connect switching, the digital subcarrier optical network comprising:
    a receiver operable to detect an incoming optical signal on a particular wavelength and to decompose the optical signal into one or more radio-frequency signals, wherein each of the one or more radio-frequency signals has a destination;
    a radio-frequency crossbar circuit switch operable to receive the one or more radio-frequency signals and direct them to an output circuit based on their destinations; and
    a transmitter operable to receive the one or more radio-frequency signals from the radio-frequency crossbar circuit switch and assign them a new frequency, group them according to their destinations, and modulate them onto an outgoing optical signal.

5. The digital subcarrier optical network as set forth in claim 4, wherein the receiver uses coherent detection to detect the incoming optical signal.

6. The digital subcarrier optical network as set forth in claim 4, wherein the receiver assigns the one or more radio-frequency signals to one or more subcarrier channels.

7. The digital subcarrier optical network as set forth in claim 6, wherein the subcarrier channels are static.

8. The digital subcarrier optical network as set forth in claim 6, wherein the subcarrier channels are dynamically created and eliminated as needed.

9. The digital subcarrier optical network as set forth in claim 6, wherein the receiver includes one or more narrow-band Nyquist filters operable to spectrally separate the subcarrier channels.

10. The digital subcarrier optical network as set forth in claim 6, wherein the receiver allows for selecting one or more of the subcarrier channels by tuning an optical local oscillator to a desired subcarrier frequency in a received optical spectrum, and using coherent IQ detection to translate the received optical spectrum to an electrical domain.

11. The digital subcarrier optical network as set forth in claim 6, wherein the transmitter is operable to assign a different transmission rate to each subcarrier channel, wherein each transmission rate is approximately between less than one giga-bit-per-second and hundreds of giga-bits-per-second.

12. The digital subcarrier optical network as set forth in claim 6, wherein the transmitter is operable to combine a plurality of the subcarrier channels in the outgoing optical signal.

13. The digital subcarrier optical network as set forth in claim 6, wherein the receiver is operable to bundle together two or more of the subcarrier channels having a common destination, and the radio-frequency crossbar circuit switch is operable to switch the bundled two or more subcarrier channels to the same output circuit based on the common destination.

14. The digital subcarrier optical network as set forth in claim 6, wherein the radio-frequency crossbar circuit switch includes a plurality of interconnected crossbar modules, with each crossbar module handling a subset of the subcarrier channels.

15. The digital subcarrier optical network as set forth in claim 14, wherein two or more of the crossbar modules are decentralized crossbar modules connected to an incoming subcarrier channel and an outgoing subcarrier channel, and one or more of the crossbar modules are centralized crossbar modules connecting the two or more decentralized crossbar modules together.

16. The digital subcarrier optical network as set forth in claim 6, wherein the radio-frequency crossbar circuit switch is operable to apply unequal power and different levels of modulation to different subcarrier channels in order to equalize transmission performance.

17. The digital subcarrier optical network as set forth in claim 4, wherein the radio-frequency crossbar circuit switch includes a plurality of analog radio-frequency switches.

18. The digital subcarrier optical network as set forth in claim 4, wherein the radio-frequency crossbar circuit switch includes a plurality of regenerative digital switches.

19. The digital subcarrier optical network as set forth in claim 4, wherein the transmitter digitally generates one or more coherent subcarrier channels, and assigns the one or more radio-frequency signals to the one or more coherent subcarrier channels.

20. The digital subcarrier optical network as set forth in claim 19, wherein the transmitter is operable to assign a different transmission rate to each subcarrier channel, wherein each transmission rate is approximately between less than one giga-bit-per-second and hundreds of giga-bits-per-second.

21. The digital subcarrier optical network as set forth in claim 19, wherein the transmitter is operable to combine a plurality of the subcarrier channels in the outgoing optical signal.

22. A digital subcarrier optical network using digital subcarrier cross-connect switching, the digital subcarrier optical network comprising:
   a receiver operable to detect an incoming optical signal on a particular wavelength and to decompose the optical signal into one or more radio-frequency signals, wherein each of the one or more radio-frequency signals has a destination, and operable to assign the one or more radio-frequency signals to one or more subcarrier channels based on their destinations;
   a radio-frequency crossbar circuit switch operable to receive the one or more radio-frequency signals on the one or more subcarrier channels and direct them to one or more output circuits based on their destinations; and
   a transmitter operable to receive the one or more radio-frequency signals on the one or more subcarrier channels from the radio-frequency crossbar circuit switch and assign them a new frequency, group them according to their destinations, and modulate them onto an outgoing optical signal.

23. The digital subcarrier optical network as set forth in claim 22, wherein the receiver uses coherent detection to detect the incoming optical signal.

24. The digital subcarrier optical network as set forth in claim 22, wherein the subcarrier channels are static.

25. The digital subcarrier optical network as set forth in claim 22, wherein the subcarrier channels are dynamically created and eliminated as needed.

26. The digital subcarrier optical network as set forth in claim 22, wherein the receiver includes one or more narrow-band Nyquist filters operable to spectrally separate the subcarrier channels.

27. The digital subcarrier optical network as set forth in claim 22, wherein the receiver allows for selecting one or more of the subcarrier channels by tuning an optical local oscillator to a desired subcarrier frequency in a received optical spectrum, and using coherent IQ detection to translate the received optical spectrum to an electrical domain.

28. The digital subcarrier optical network as set forth in claim 22, wherein the transmitter is operable to assign a different transmission rate to each subcarrier channel, wherein each transmission rate is approximately between less than one giga-bit-per-second and hundreds of giga-bits-per-second.

29. The digital subcarrier optical network as set forth in claim 22, wherein the transmitter is operable to combine a plurality of the subcarrier channels in the outgoing optical signal.

30. The digital subcarrier optical network as set forth in claim 22, wherein the receiver is operable to bundle together two or more of the subcarrier channels having a common destination, and the radio-frequency crossbar circuit switch is operable to switch the bundled two or more subcarrier channels to the same output circuit based on the common destination.

31. The digital subcarrier optical network as set forth in claim 22, wherein the radio-frequency crossbar circuit switch includes a plurality of interconnected crossbar modules, with each crossbar module handling a subset of the subcarrier channels.

32. The digital subcarrier optical network as set forth in claim 31, wherein two or more of the crossbar modules are decentralized crossbar modules connected to an incoming subcarrier channel and an outgoing subcarrier channel, and one or more of the crossbar modules are centralized crossbar modules connecting the two or more decentralized crossbar modules together.

33. The digital subcarrier optical network as set forth in claim 22, wherein the radio-frequency crossbar circuit switch is operable to apply unequal power and different levels of modulation to different subcarrier channels in order to equalize transmission performance.

34. The digital subcarrier optical network as set forth in claim 22, wherein the radio-frequency crossbar circuit switch includes a plurality of analog radio-frequency switches.

35. The digital subcarrier optical network as set forth in claim 22, wherein the radio-frequency crossbar circuit switch includes a plurality of regenerative digital switches.

* * * * *